United States Patent
Duong

(10) Patent No.: US 11,060,599 B2
(45) Date of Patent: *Jul. 13, 2021

(54) SYSTEM AND APPARATUS FOR INTERCHANGEABLE SMART GEARBOX

(71) Applicant: Raytheon Technologies Corporation, Farmington, CT (US)

(72) Inventor: Hung Duong, Unionville, CT (US)

(73) Assignee: Raytheon Technologies Corporation, Farmington, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 16/985,435

(22) Filed: Aug. 5, 2020

(65) Prior Publication Data

US 2020/0362953 A1    Nov. 19, 2020

Related U.S. Application Data

(60) Division of application No. 15/075,738, filed on Mar. 21, 2016, now Pat. No. 10,767,749, which is a continuation of application No. PCT/US2014/068182, filed on Dec. 2, 2014.

(60) Provisional application No. 61/914,018, filed on Dec. 10, 2013.

(51) Int. Cl.
*F16H 57/025* (2012.01)
*F02C 7/32* (2006.01)
*F16H 57/033* (2012.01)
*F16H 1/22* (2006.01)

(52) U.S. Cl.
CPC ............. *F16H 57/025* (2013.01); *F02C 7/32* (2013.01); *F16H 57/033* (2013.01); *F16H 1/222* (2013.01)

(58) Field of Classification Search
CPC .. F02C 7/32; F02C 7/36; F02F 7/0068; F16H 57/021; F16H 57/025; F16H 57/033; F16H 1/222; B60K 25/00; F02K 3/06
See application file for complete search history.

(56) References Cited

U.S. PATENT DOCUMENTS

| | | | |
|---|---|---|---|
| 1,922,812 A * | 8/1933 | Kennedy | F16H 55/17 74/439 |
| 2,038,509 A * | 4/1936 | Falk | F16H 55/12 74/439 |
| 2,184,840 A | 12/1939 | Johansson | |
| 2,432,358 A | 12/1947 | Warner | |

(Continued)

FOREIGN PATENT DOCUMENTS

EP        0540192        5/1993

OTHER PUBLICATIONS

International Preliminary Report on Patentability dated Jun. 14, 2016 in Application No. PCT/US2014/068182.

(Continued)

*Primary Examiner* — Daniel D Yabut
(74) *Attorney, Agent, or Firm* — Snell & Wilmer L.L.P.

(57) ABSTRACT

Adapter plates for mounting accessories to a gearbox of a turbine engine are described herein. The adapter plates may be inverted to mount with various equipment, such as a variable frequency generator, oil pump, a fuel pump, a hydraulic pump, an alternator, an electrical generator, and a starter. Gear shafts may comprise splines in a particular form/shape for mating with the gears. The gears may be inverted to expose a desired spline configuration.

9 Claims, 6 Drawing Sheets

(56) References Cited

U.S. PATENT DOCUMENTS

| | | | |
|---|---|---|---|
| 2,756,607 A * | 7/1956 | Mochel | F16H 55/06 |
| | | | 74/439 |
| 2,978,869 A | 4/1961 | Hiscock et al. | |
| 3,220,078 A | 11/1965 | Preziosoi | |
| 4,372,517 A | 2/1983 | Welch et al. | |
| 4,610,175 A | 9/1986 | Weis | |
| 7,500,365 B2 | 3/2009 | Suciu et al. | |
| 8,490,411 B2 | 7/2013 | Suciu | |
| 10,767,749 B2 * | 9/2020 | Duong | F02C 7/32 |
| 2006/0248900 A1 | 11/2006 | Suciu et al. | |
| 2011/0239660 A1 | 10/2011 | Suciu et al. | |
| 2011/0289936 A1 | 12/2011 | Suciu et al. | |
| 2012/0118103 A1 | 5/2012 | Blewett | |

OTHER PUBLICATIONS

International Search Report and Written Opinion dated Mar. 4, 2015 in Application No. PCT/US2014/068182.
USPTO; Notice of Allowance dated May 7, 2020 In U.S. Appl. No. 15/075,738.
USPTO; Restriction Requirement Office Action dated Dec. 20, 2017 In U.S. Appl. No. 15/075,738.
USPTO; Non-Final Office Action dated May 3, 2018 In U.S. Appl. No. 15/075,738.
USPTO; Final Office Action dated Sep. 28, 2018 In U.S. Appl. No. 15/075,738.
USPTO; Advisory Action dated Nov. 21, 2018 In U.S. Appl. No. 15/075,738.
USPTO; Non-Final Office Action dated Dec. 20, 2018 In U.S. Appl. No. 15/075,738.
USPTO; Final Office Action dated Apr. 10, 2019In U.S. Appl. No. 15/075,738.
USPTO; Advisory Action dated May 6, 2019 In U.S. Appl. No. 15/075,738.
USPTO; Non-Final Office Action dated May 30, 2019 In U.S. Appl. No. 15/075,738.
USPTO; Final Ofice Action dated 19-24-2019 in U.S. Appl. No. 15/075,738.
USPTO; Advisory Action dated Dec. 2, 2019 In U.S. Appl. No. 15/075,738.
USPTO; Non-Final Office Action dated Dec. 23, 2019 In U.S. Appl. No. 15/075,738.

\* cited by examiner

SYSTEM AND APPARATUS FOR INTERCHANGEABLE SMART GEARBOX

CROSS-REFERENCE TO RELATED APPLICATIONS

This application is a divisional of, claims priority to and the benefit of, U.S. Ser. No. 15/075,738 filed on Mar. 21, 2016 and entitled "SYSTEM AND APPARATUS FOR INTERCHANGEABLE SMART GEARBOX." The '738 application is a continuation of, claims priority to and the benefit of, PCT/US2014/068182 filed on Dec. 2, 2014 and entitled "SYSTEM AND APPARATUS FOR INTERCHANGEABLE SMART GEARBOX," which claims priority from U.S. Provisional Application No. 61/914,018 filed on Dec. 10, 2013 and entitled "SYSTEM AND APPARATUS FOR INTERCHANGEABLE SMART GEARBOX." All of the aforementioned applications are incorporated herein by reference in their entirety for all purposes.

FIELD OF INVENTION

The present disclosure relates to a gearbox for a gas turbine engine.

BACKGROUND OF THE INVENTION

A typical gas turbine engine for an aircraft may include an accessory drive gearbox. The gearbox is rotationally coupled to at least one spool of the engine by a tower shaft. The gearbox may be coupled to an engine core and enclosed by a core nacelle surrounding the engine core. A compact gearbox configuration may be desirable to fit within the space between the core nacelle and engine core. Reducing inventory of spare parts and the need for multiple dissimilar components is also desirable.

SUMMARY OF THE INVENTION

A system and method for coupling accessories to a gearbox of a turbine engine are described herein. A gearbox may comprise a gearbox adaptor configured for coupling accessories to the gearbox. A gearbox adaptor may include a first side configured for coupling a first gearbox accessory to the gearbox and a second side configured for coupling a second gearbox accessory to the gearbox. The first side may comprise a first mounting pattern and the second side may comprise a second mounting pattern. The first mounting pattern and the second mounting pattern may be configured for mating with the first mounting pattern of the first accessory and the second mounting pattern of the second accessory respectively. The accessories may be a variable frequency generator, an oil pump, a fuel pump, a hydraulic pump, an alternator, an electrical generator, a starter and/or the like. Gear shafts may comprise splines in a particular form/shape for mating with the accessories. The gear shafts may be inverted to expose a desired spline configuration. A gearbox of a turbine engine may comprise an adapter. The adapter may comprise an adapter first side and an adapter second side. The adapter first side may be configured for coupling a first gearbox accessory to the gearbox and the adapter second side may be configured for coupling a second gearbox accessory to the gearbox. The gearbox may comprise at least one gear. The gear may comprise a gear first side and a gear second side. The gear first side may be configured for coupling the spline of a first gearbox accessory to the gear and the gear second side may be configured for coupling the spline of a second gearbox accessory to the gear.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Different cross-hatching and/or surface shading may be used throughout the figures to denote different parts but not necessarily to denote the same or different materials.

Figure 1:
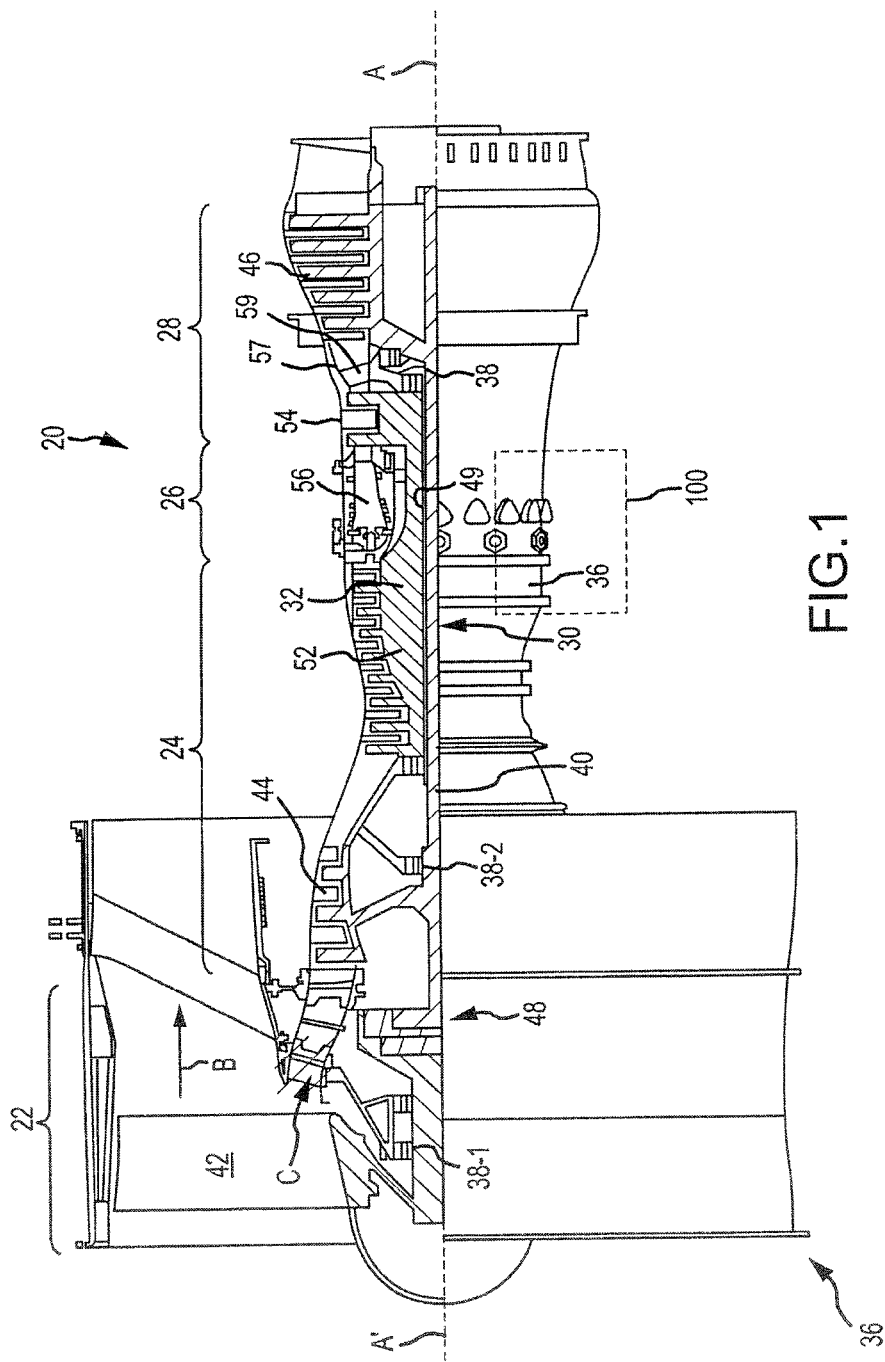
FIG. 1 is a cross-sectional view of a gas turbine engine, in accordance with various embodiments.

In various embodiments, and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 may drive air along a bypass flow-path B while compressor section 24 can drive air along a core flow-path C for compression and communication into combustor section 26 then expansion through turbine section 28. Although depicted as a turbofan gas turbine engine herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 via several bearing systems 38, 38-1, and 38-2. It should be understood that various bearing systems at various locations may alternatively or additionally be provided, including for example, bearing system 38, bearing system 38-1, and bearing system 38-2.

Low speed spool 30 may generally comprise an inner shaft 40 that interconnects a fan 42, a low pressure (or first) compressor section 44 and a low pressure (or first) turbine section 46. Inner shaft 40 may be connected to fan 42 through a geared architecture 48 that can drive fan 42 at a lower speed than low speed spool 30. High speed spool 32 may comprise an outer shaft 49 that interconnects a high pressure (or second) compressor section 52 and high pressure (or second) turbine section 54. A combustor 56 may be located between high pressure compressor section 52 and high pressure turbine section 54. A mid-turbine frame 57 of engine static structure 36 may be located generally between high pressure turbine section 54 and low pressure turbine section 46. Mid-turbine frame 57 may support one or more bearing systems 38 in turbine section 28. Inner shaft 40 and outer shaft 49 may be concentric and rotate via bearing systems 38 about the engine central longitudinal axis A-A', which is collinear with their longitudinal axes. As used herein, a "high pressure" compressor or turbine experiences a higher pressure and temperature than a corresponding "low pressure" compressor or turbine.

The core airflow C may be compressed by low pressure compressor section 44 then high pressure compressor section 52, mixed and burned with fuel in combustor 56, then expanded over high pressure turbine section 54 and low pressure turbine section 46. Mid-turbine frame 57 includes airfoils 59 which are in the core airflow path. Turbines 46, 54 rotationally drive the respective low speed spool 30 and high speed spool 32 in response to the expansion.

Gas turbine engine 20 may be, for example, a high-bypass geared aircraft engine. In various embodiments, the bypass ratio of gas turbine engine 20 may be greater than about six (6). In various other embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. In various embodiments, the diameter of fan 42 may be significantly larger than that of the low pressure compressor section 44, and the low pressure turbine section 46 may have a pressure ratio that is greater than about 5:1. Low pressure turbine section 46 pressure ratio may be measured prior to inlet of low pressure turbine section 46 as related to the pressure at the outlet of low pressure turbine section 46 prior to an exhaust nozzle. It should be understood, however, that the above parameters are exemplary of various embodiments of a suitable geared architecture engine and that the present disclosure contemplates other gas turbine engines including direct drive turbofans. The general location of the coupling location of gearbox 100 with gas turbine engine 20 is depicted via gearbox 100 in a dashed rectangle.

Figure 2:
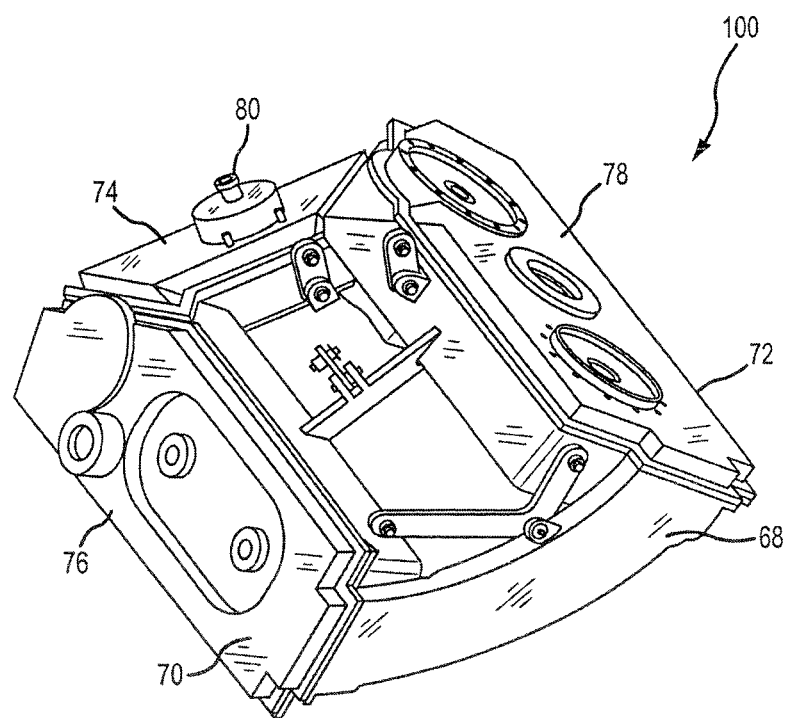
FIG. 2 is a perspective view of a gearbox in accordance with various embodiments.

According to various embodiments and with reference to FIG. 2, a gearbox 100, such as an accessory gearbox, is depicted. A tower shaft (not shown) may be driven by a turbine shaft (not shown), and drives input shaft 80. The input shaft 80 in turn drives a gear that drives a number of gears within the accessory gearbox 100. Several accessories may be driven by the gears. Among the accessories may be an oil pump, a fuel pump, a hydraulic pump, an alternator, an electrical generator, and a starter, as examples. The tower shaft may be connected to an input shaft 80 that is supported by the gearbox 100. The input shaft 80 provides the rotational coupling to various accessory drive components.

According to various embodiments and with brief reference to FIGS. 3B, 4B, 5A and 5B, adapter plates 200, 350 configured for mounting accessories to gearbox 100 are described herein. Adapter plates 200, 350 may be inverted to add diversity of mounting to with various equipment, such as a variable frequency generator, oil pump, a fuel pump, a hydraulic pump, an alternator, an electrical generator, and a starter.

The gearbox 100 is provided by a generally U-shaped housing 68 having a first and second housing portion 70, 72 interconnected to one another, at least partially, by an intermediate housing portion 74. The intermediate housing portion 74 supports the input shaft 80. Accessory drive components may be mounted on faces 76, 78 on the first and second housing portions 70, 72, as desired, rather than a mounting orientation where their rotational axes are in the same direction as the core engine axis A-A'. That is, the axes of the accessory drive components are arranged generally circumferentially relative to core engine axis A-A'. The first, second and intermediate housing portions 70, 72, 74 may respectively house first, second and third gear sets for driving components (not shown) each having their own non parallel axes of revolution.

Figure 3A:
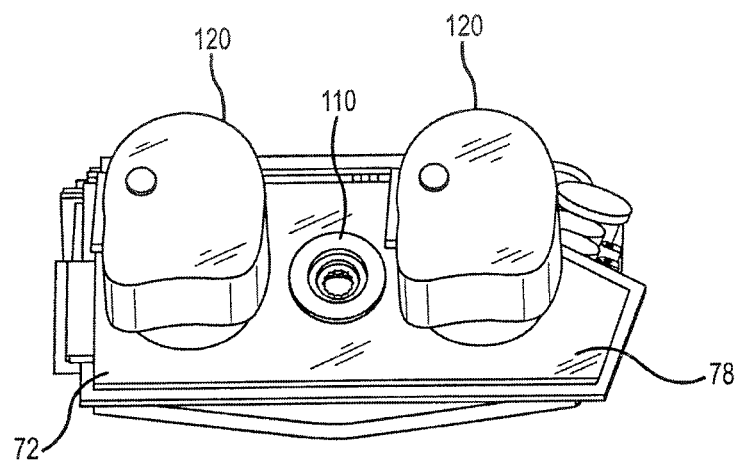
FIGS. 3A and 3B are views of a face of the second housing of the gearbox in accordance with various embodiments.
Figure 3B:
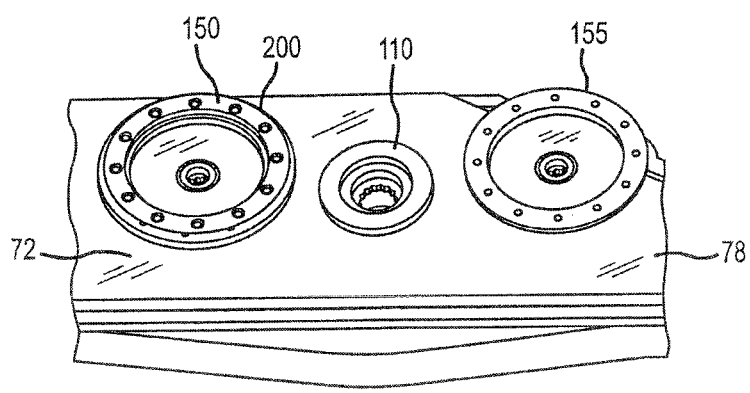

According to various embodiments and with reference to FIG. 3A variable frequency generators (VFG) 120 are mounted to the face 78 of second housing portion 72. A VFG may be used in applications with a high percentage of resistive AC or DC loads and configured to provide power to many accessories and/or systems of the aircraft. A permanent magnet alternator PMA 110 may be coupled to the face 78 of second housing portion 72. With reference to FIG. 3B, the VFGs 120 of FIG. 3A are not shown such that adapter plate 200 may be viewed. Adapter plate 200 may be configured such that gearbox 100 may receive a plurality of VFGs 120 having different operational specifications, such as different desired revolution speeds for each VFG 120, 130 (with brief reference to FIG. 4A). For instance, a first side 150 of adapter plate 200 may be configured for mating with a first VFG 120. Adapter plate 200 may be coupled to second housing portion 72 though any desired coupling mechanism, such as by bolting adapter plate 200 to second housing portion 72.

Figure 4A:
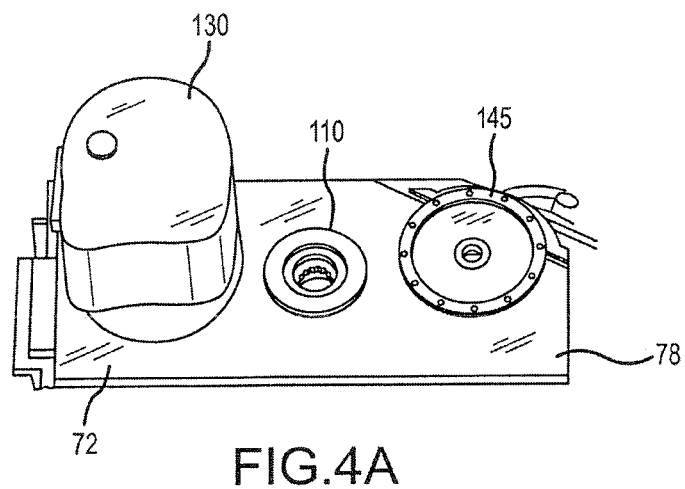
FIGS. 4A and 4B are views of a face of the second housing of the gearbox in accordance with various embodiments.

According to various embodiments and with reference to FIG. 4A, adapter plate 200 of FIGS. 3A and 3B, may be inverted (with respect to its orientation as depicted in FIG. 3B) and coupled to gearbox 100 such that first side 150 may be closer to the face 78 of second housing portion 72 and a second side 250 of adapter plate 200 may be exposed (e.g., available to be coupled to). Second side 250 of adapter plate 200 may be configured for mating with VFG 130 as depicted in FIG. 4A.

Figure 4B:
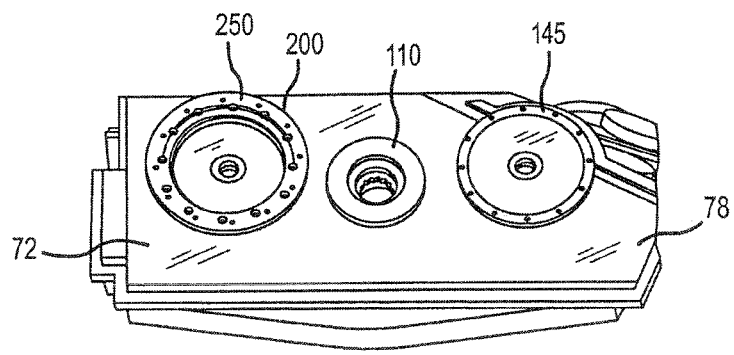

As depicted in FIG. 4B (with VFG 120 not shown for clarity), second side 250 of adapter plate 200 may have a different mounting configuration as compared with the mounting configuration of face 150. Gear shafts of the accessories may comprise splines in a particular form/shape for mating with the gears of gearbox 100. For instance, a particular spline configuration of one accessory shaft may be configured to mate with a particular female spline configuration on a gear. In this way, the likelihood of incorrect assembly of parts is greatly reduced. As desired, each gear may comprise a plurality of spline configurations for mounting with more than one accessory, (i.e. however, each gear may be coupled to one accessory at any given time). A standard mounting plate 155 (with no adaptor plate 200) may be used with gearbox 100. First side 150 and second side 250 of adapter plate 200 may be marked with identifiers to indicate which coupling is appropriate for the exposed/outwardly facing side. For instance, the indicator may be a color, a picture, text, and/or the like to reduce installation errors. Stated another way the adaptor may be marked with an indicator to designate which side first side 150 and/or second side 250 faces away from the gearbox. As depicted in FIGS. 4A and 4B a top cover 145 may be mounted to face 78 of second housing portion 72 to cover the previously exposed mounting location of a VFG 120 as depicted in FIG. 3A.

Each side of adapter plate 200, such as first side 150 and second side 250 may be configured for any suitable mounting technique. For instance, first side 150 or second side 250 may be quick attach/detach (QAD) attachment, or configured for bolt mounting. A QAD coupler may act as a coupler between the gearbox and the VFG, for ease of mounting. The QAD system may be integral to adapter plate 200 and/or coupled to adapter plate 200.

Figure 5A:
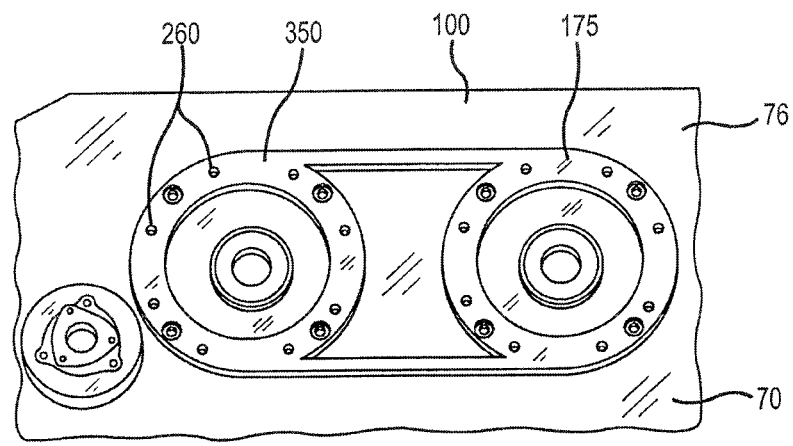
FIGS. 5A and 5B are views of a face of the first housing of the gearbox in accordance with various embodiments.
Figure 5B:
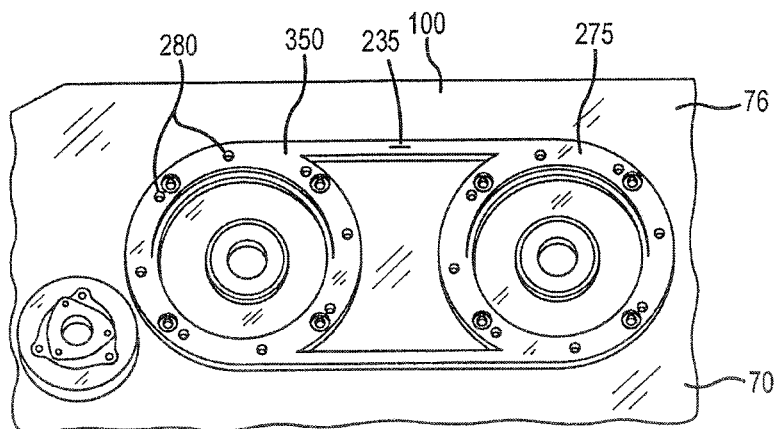
Figure 6:
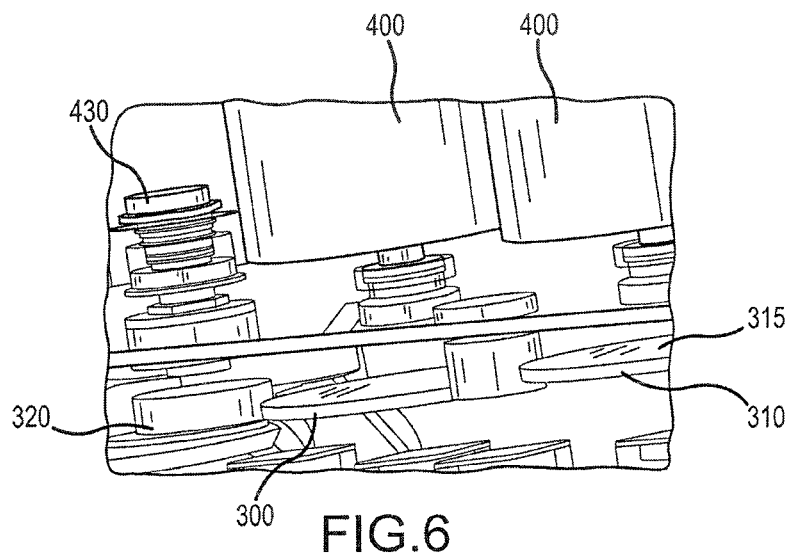
FIG. 6 is a view of the internal workings of gears of the first housing in response the gears being in a first position in accordance with various embodiments.
Figure 7:
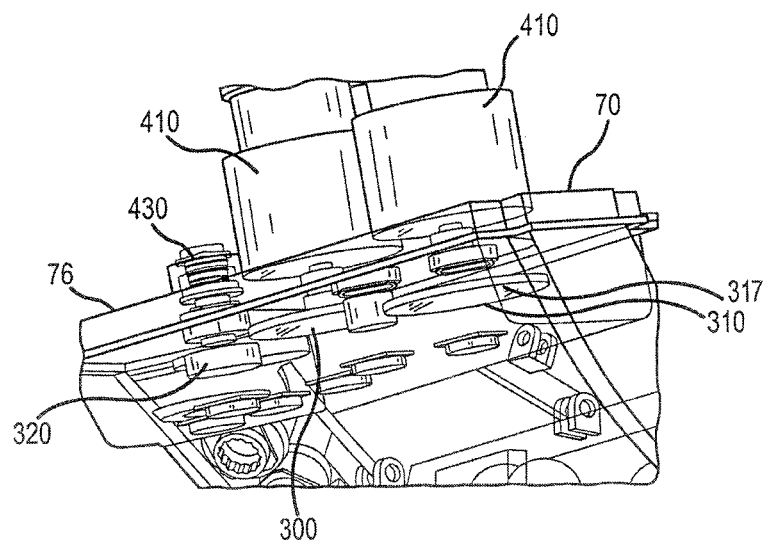
FIG. 7 is a view of the workings of gears of the first housing in response the gears being in a second position in accordance with various embodiments.

According to various embodiments and with reference to FIG. 5A similar to the capabilities of adaptor plate 200, adapter plate 350 may be configured for mounting accessories such as pumps, (e.g., hydraulic pumps) on the face 76 of first housing portion 70. A first side 175 of adapter plate 350 may be configured for mating with a first pump (pump 400 as shown in FIG. 6). For instance a bolting pattern 260 may be set for receiving a particular accessory. With reference to FIG. 5B, adapter plate 350 of FIG. 5A may be inverted (with respect to its orientation as depicted in FIG. 5A) and coupled to gearbox 100 such that first side 175 may be closer to the face 78 of first housing portion 70 and a second side 275 of adapter plate 350 may be exposed. Second side 275 of adapter plate 350 may be configured for mating with a second pump (pump 410 as shown in FIG. 7). Second side 275 of adapter plate 350 may have different mounting configuration, e.g. a different bolting pattern 280 for mounting with a corresponding pump 410. Similar to the markings of adapter plate 200, first side 175 and/or second side 275 of adapter plate 350 may be marked with identifiers 235 to indicate which coupling is appropriate for the exposed side.

With reference to FIG. 6, representative gears orientations of first housing portion 70 are depicted. In a first orientation, such as configured for running pump 400, gear 300 may be configured to operatively couple with gear 320 of deoiler (430). In the first orientation gear 300 may turn counter-clockwise. With reference to FIG. 7, the gears are depicted in a second orientation, such as configured for running pump 410. Gear 300 may be inverted as compared with its position while it is in the first orientation as depicted in FIG. 6. In the second orientation, gear 300 may be configured to operatively couple with a different gear of gearbox 100 such that gear 300 may turn clockwise. Gear 310 may be inverted such that its splines may mate with the splines of pump 410. Stated another way, each face, (top surface 315 and bottom surface 317) of gear 300 and/or 310 may comprise varying splines for mating with different accessories. In this way, a single gearbox may be designed to run a wider variety of accessories than was previously possible. According to various embodiments, adaptors may be coupled to the gear to mate with the varied shaft splines of the accessories.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A gearbox of a turbine engine comprising:
an adapter, wherein the adapter comprises a first side and a second side,
wherein the first side is configured for coupling a first gearbox accessory to the gearbox, wherein the second side is configured for coupling a second gearbox accessory to the gearbox, wherein the adaptor is configured to be inverted such that at least one of the first side or the second side faces the gearbox,
wherein the first side comprises a first mounting pattern and the second side comprises a second mounting pattern, wherein the first mounting pattern is configured for mating with a first mounting pattern of the first gearbox accessory, and wherein the second mounting pattern is configured for mating with a second mounting pattern of the second gearbox accessory,
wherein, the adaptor is selectively configured to couple the first gearbox accessory to the gearbox or the second gearbox accessory to the gearbox in response to an inversion of the at least one of the first side or the second side facing the gearbox,
wherein the first mounting pattern comprises a first plurality of holes extending only partially into the adapter from the first side and wherein the second mounting pattern comprises a second plurality of holes extending only partially into the adapter from the second side; and
a gear, wherein the gear comprises a gear first side and a gear second side,
wherein the gear first side is configured for coupling a first spline of the first gearbox accessory to the gear and the gear second side is configured for coupling a second spline of the second gearbox accessory to the gear.

2. The gearbox of claim 1, wherein the adapter is marked with an indicator to designate that the first side faces away from the gearbox.

3. The gearbox of claim 1, wherein at least one of the first side and the second side are configured for quick attachment/detachment coupling.

4. The gearbox of claim 1, wherein the gear comprises a plurality of splines for mating with at least one of the first gearbox accessory and the second gearbox accessory.

5. The gearbox of claim 1, wherein the gear is configured to operate in a clockwise direction in response to the gear being positioned in a first orientation and the gear is configured to operate in a counter-clockwise direction in response to the gear being positioned in a second orientation.

6. The gearbox of claim 5, wherein the gear is inverted in the second orientation as compared with positioning of the gear in the first orientation.

7. The gearbox of claim 1, wherein at least one of the first gearbox accessory and the second gearbox accessory are at least one of a variable frequency generator, an oil pump, a fuel pump, a hydraulic pump, an alternator, an electrical generator, and a starter.

8. The gearbox of claim 1, wherein the first gearbox accessory and the second gearbox accessory are configured to operate at different respective speeds.

9. The gearbox of claim 1, further comprising a second adapter, wherein the second adapter comprises a second adapter first side and a second adapter second side, wherein the second adapter first side is configured for coupling the first gearbox accessory to the gearbox and the second adapter second side is configured for coupling the second gearbox accessory to the gearbox.

* * * * *